J. W. KOHLHEPP.
CARCASS CLEANING MACHINE.
APPLICATION FILED JUNE 6, 1918.
1,323,636.
Patented Dec. 2, 1919.
5 SHEETS—SHEET 1.
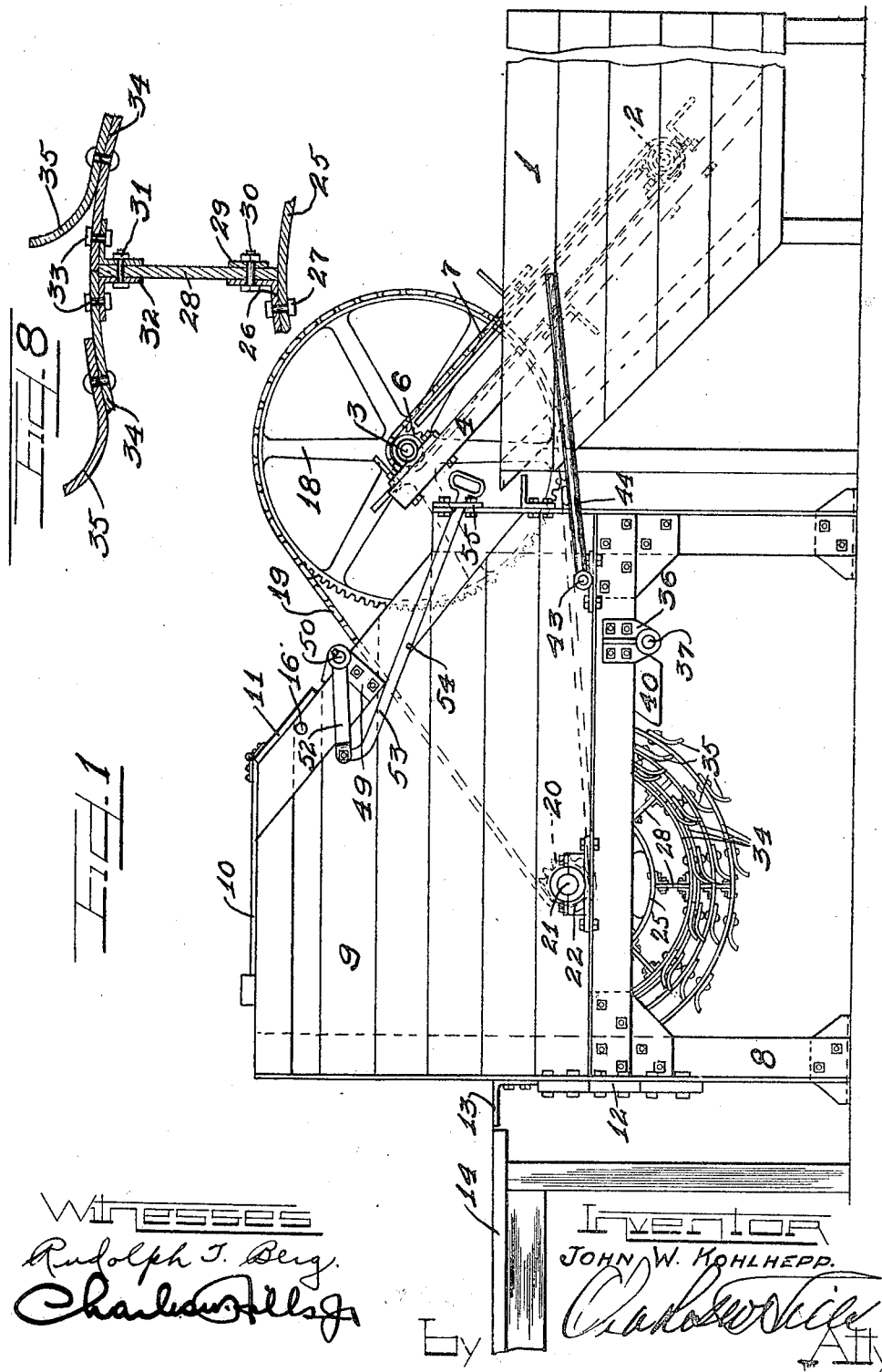

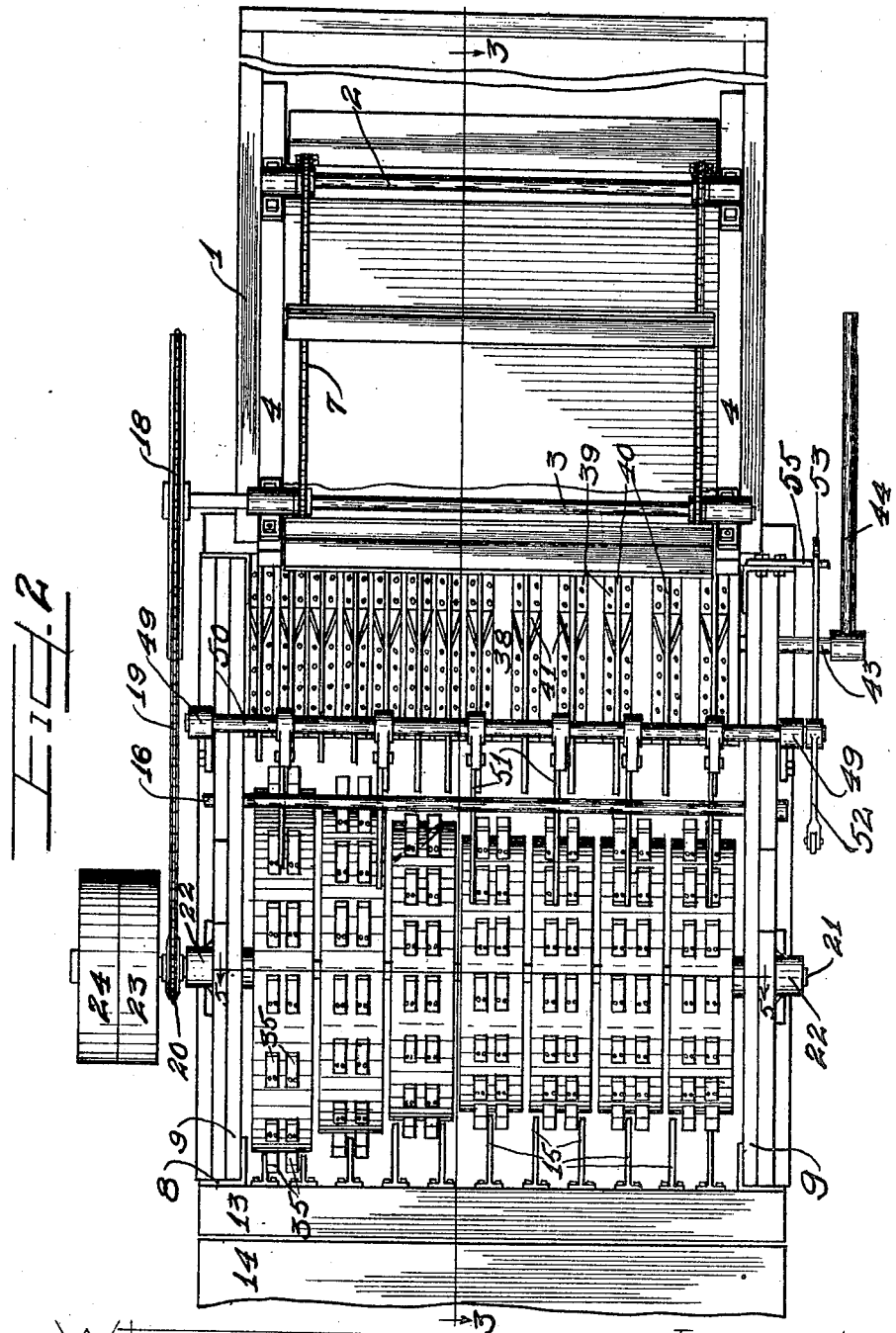

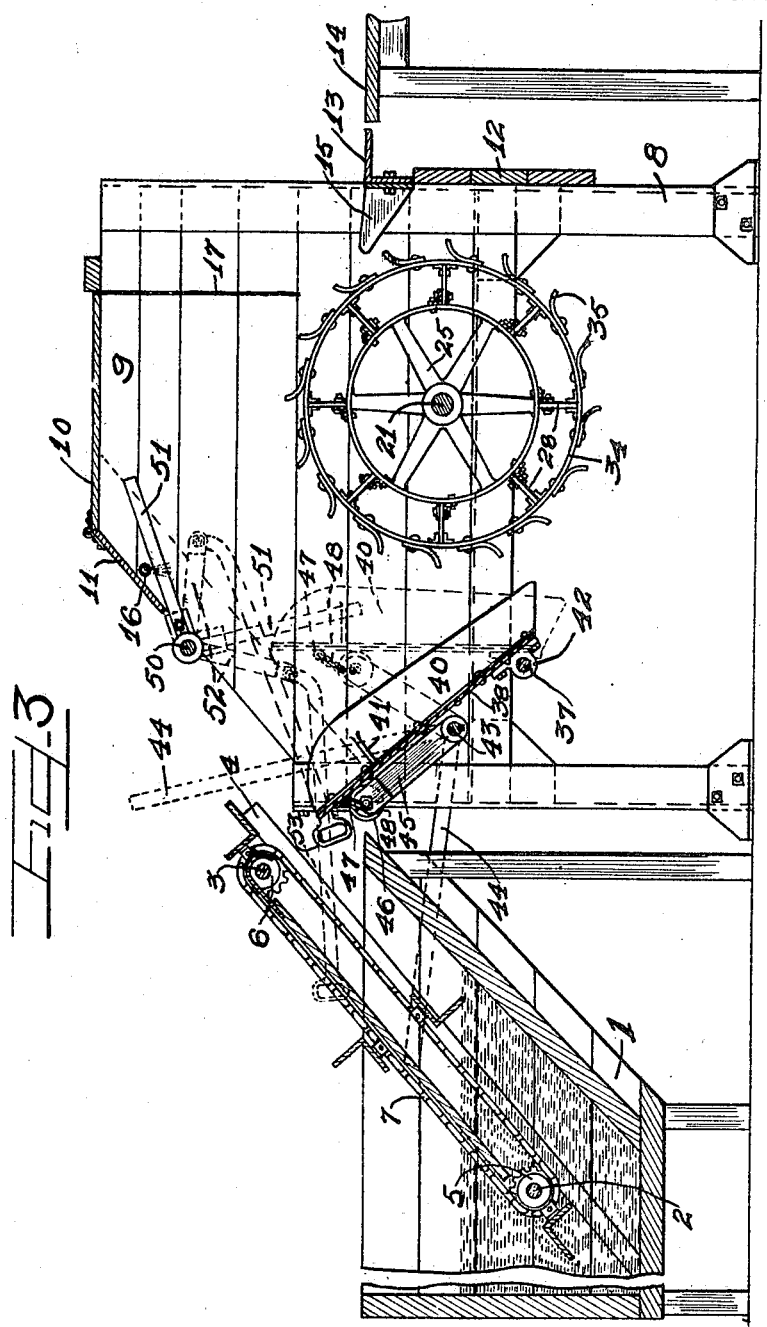

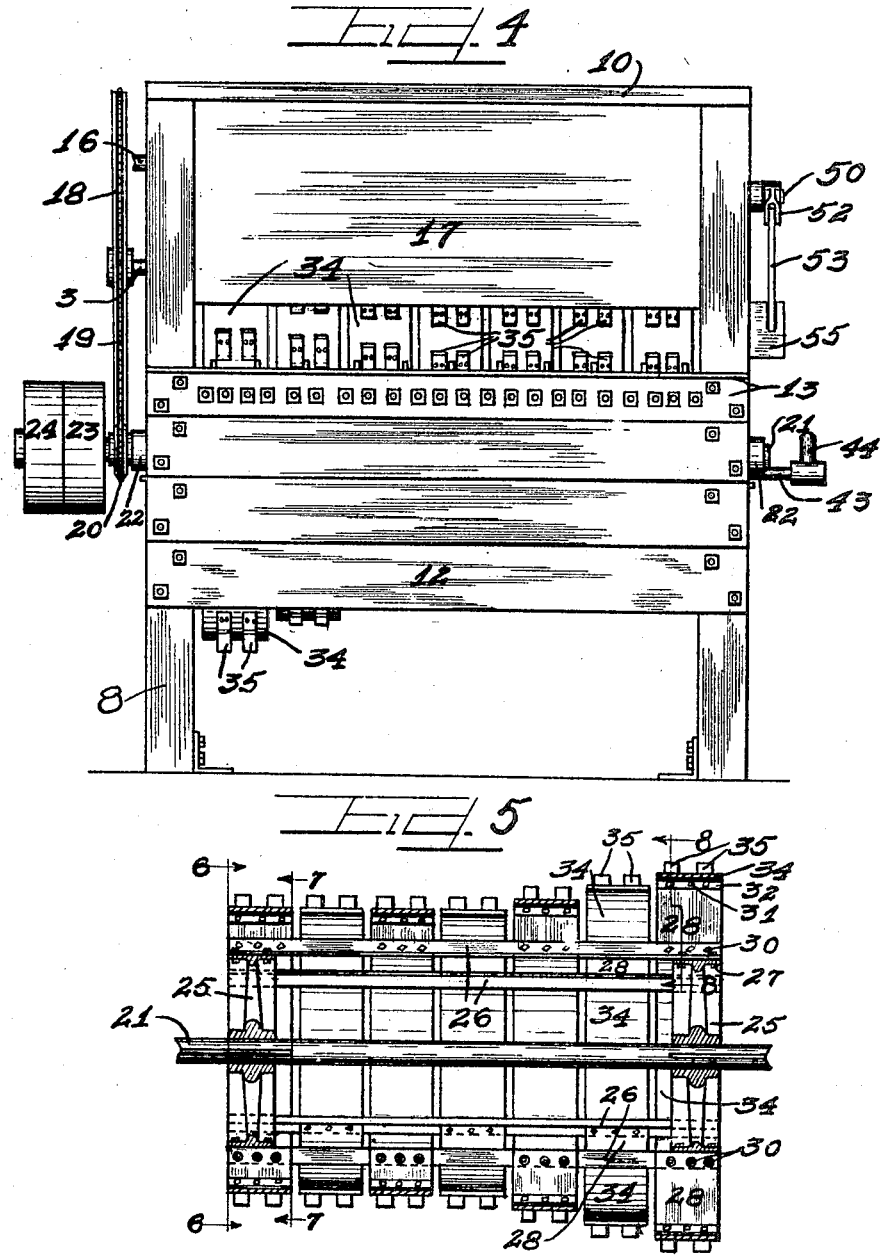

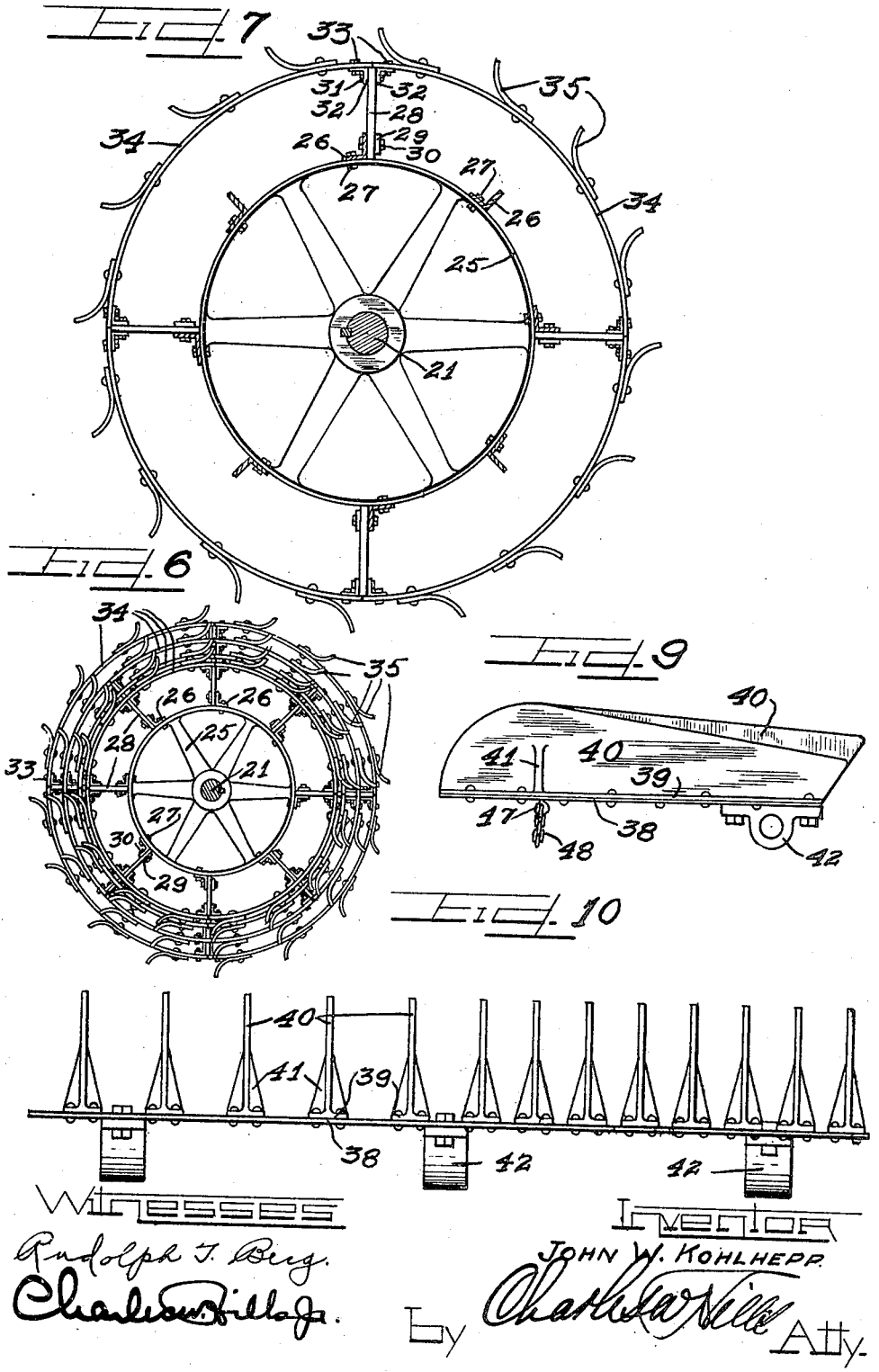

UNITED STATES PATENT OFFICE.

JOHN W. KOHLHEPP, OF CHICAGO, ILLINOIS, ASSIGNOR TO THE ALLBRIGHT-NELL COMPANY, OF CHICAGO, ILLINOIS, A CORPORATION OF ILLINOIS.

CARCASS-CLEANING MACHINE.

1,323,636.            Specification of Letters Patent.        Patented Dec. 2, 1919.

Application filed June 6, 1918. Serial No. 238,473.

*To all whom it may concern:*

Be it known that I, JOHN W. KOHLHEPP, a citizen of the United States, and a resident of the city of Chicago, in the county of Cook and State of Illinois, have invented certain new and useful Improvements in Carcass-Cleaning Machines; and I do hereby declare that the following is a full, clear, and exact description of the same, reference being had to the accompanying drawings, and to the numerals of reference marked thereon, which form a part of this specification.

This invention relates to an improved type of sanitary silently operating carcass cleaning and dehairing machine wherein a carcass is conveyed from a scalding vat and deposited on an adjustable rib apron and permitted to move into engagement with a rotatable flexible massaging or scraping drum mechanism which rotates and scrapes the carcass to remove the hair therefrom, after which the apron is moved into a position to permit the carcass to be gradually elevated and conveyed by said scraping drum mechanism, and then discharged thereby from the machine.

It is an object of this invention to construct a silently operating carcass cleaning machine wherein a carcass is first dehaired and then conveyed through the machine by a flexible scraping drum mechanism.

It is also an object of the invention to provide a carcass cleaning machine adapted to operate with a small amount of noise and wherein a receiving chute in normal position is adapted to retain a carcass in position to be cleaned by a scraper, and in an adjusted position adapted to move the cleaned carcass into a position to permit the same to be conveyed upwardly out of the machine by the scraper.

A further object of the invention is the construction of a carcass cleaning machine wherein a scraper is first adapted to dehair a carcass and then discharge the same from the machine.

Another object of the invention is to provide a carcass dehairing machine equipped with an adjustable receiving grate adapted to move a carcass into a position to be engaged, elevated and discharged by a scraper drum.

It is a further object of the invention to provide a carcass cleaning machine wherein a carcass is movably disposed between an adjustable chute and a flexible scraping mechanism until the carcass is cleaned and discharged by said scraper mechanism.

It is furthermore an object of this invention to construct a carcass cleaning machine wherein a flexible scraping mechanism coacts with an adjustable carcass receiving grate to first clean a carcass and then convey the carcass upwardly over itself to discharge the carcass from the machine.

Another object of the invention is to provide a carcass cleaning machine having manually controlled means for guiding a carcass into the field of operating of a massaging and a discharging scraper mechanism.

It is also an object of the invention to construct a carcass cleaning machine wherein a carcass receiving and supporting chute is adapted to be gradually moved toward a scraper mechanism to cause dehairing and discharge of a carcass from the machine by said scraper mechanism.

An important object of the invention is the construction of a carcass cleaning machine adapted to receive and gradually guide carcasses of different sizes into the field of operation of a flexible drum mechanism which dehairs the carcasses and then acts to discharge the same from the machine.

Other and further important objects of this invention will be apparent from the disclosures in the specification and drawings.

The invention (in a preferred form) is illustrated in the drawings and hereinafter more fully described.

On the drawings:

Figure 1 is a side elevation of a carcass cleaning machine embodying the principles of this invention.

Fig. 2 is a top plan view thereof with the cover removed.

Fig. 3 is a section taken on the line 3—3, of Fig. 2, showing the operation of parts in dotted lines.

Fig. 4 is a rear elevational view of the machine.

Fig. 5 is a detail sectional view of the scraping mechanism taken on line 5—5, of Fig. 2, with parts omitted and parts in elevation.

Fig. 6 is a sectional end view of the scraping mechanism taken on line 6—6, of Fig. 5.

Fig. 7 is an enlarged sectional detail view taken on line 7—7, of Fig. 5.

Fig. 8 is an enlarged fragmentary detail section taken on line 8—8, of Fig. 5.

Fig. 9 is a side elevation of the carcass chute in horizontal position.

Fig. 10 is an end view thereof.

As shown on the drawings:

Disposed in front of the carcass cleaning machine is a scalding vat 1, having a lower shaft 2, journaled transversely therein and an upper shaft 3, rotatably mounted above the vat on suitable supports 4. Secured on the shafts 2 and 3, are sprocket wheels 5 and 6, around which is trained a conveyer 7, for delivering carcasses from the scalding vat to the cleaning machine.

The cleaning machine comprises a framework 8, to which is secured casing sides 9, made of wood or other suitable material and having secured thereon a top 10, to which a door 11, is hinged to partly close the open front portion of the casing. The casing is open at its bottom and front, and has a rear wall 12, which extends upwardly to about the middle of the framework. Secured to the framework 8, above the upper edge of the rear wall 12, is an outwardly projecting angle shelf 13, the top of which is disposed in a plane with the top of a receiving table or platform 14, disposed to the rear of the machine. Secured on the inner surface of the vertical flange of the angle shelf 13, are a plurality of inwardly projecting spaced arms or brackets 15, to form a carcass support for receiving and supporting discharged carcasses to permit the same to roll onto the table 14. Mounted in the upper portion of the machine is a sprinkling or spraying device 16. Also disposed within the machine near the rear open portion thereof is a curtain 17, the upper end of which is secured to the top 10, to permit the curtain to swing to allow carcasses to be discharged from the machine.

Secured on an extending end of the upper conveyer shaft 3, is a large sprocket wheel 18, around which a driving chain 19, is trained. The chain 19, is also engaged around a sprocket gear 20, which is keyed or otherwise secured on the extending end of a driving or scraping wheel shaft 21, which is disposed transversely of the machine and is journaled in suitable bearings 22, mounted on the framework 8. Secured on the projecting end of the shaft 21, to the outside of the sprocket gear 20, is a friction pulley 23, adapted to be connected by means of a belt to any suitable type of driving mechanism. An idler pulley 24, is rotatably mounted on the shaft 21, adjacent the driving pulley 23.

The cleaning, scraping or massaging mechanism of the device embraces a pair of flat rim wheels 25, which are keyed or otherwise secured on the shaft 21, adjacent the inner surfaces of the casing sides 9. Rigidly connecting the wheels 25, together, are a plurality of spaced angle bars 26, which are disposed parallel to the shaft 21, and have the ends of one flange thereof removably secured to the rims of the wheels 25, by bolts 27, or other suitable means, while the other flange projects radially from the wheel rims. Rigidly but removably secured to the projecting flanges of the angle bars 26, are a plurality of adjacently disposed flexible cleaning, massaging or scraping wheels, all of which are identical in construction with the exception that certain of the wheels near one end of the shaft 21, are of increased or different diameters to afford a flexible scraping drum mechanism adapted not only to conform to the bodies of carcasses, but also affording an arrangement whereby the scraping and cleaning of carcasses of different sizes is facilitated. As clearly shown in Fig. 5, alternate flexible scraping wheels are connected to alternate angle bars.

Each flexible scraping wheel comprises a plurality of flexible radial arms or spokes 28, made of flexible belting or other suitable flexible material and having the lower ends thereof removably secured to the radial flanges of alternate angle bars 26, by means of washers 29, and bolts 30. Rigidly but removably secured on each side of the outer end of each of the flexible arms or spokes 28, by means of bolts 31, are the radial flanges of oppositely directed angle braces 32. Rigidly secured by means of bolts 33, or other suitable means to the peripheral flanges of the angle braces 32, at the outer ends of the flexible arms 28, are flexible rim strips or sections 34, made of flexible belting or other suitable material. The strips 34, form the rims of the flexible wheels, and each strip 34, has rigidly secured on the outer surface thereof a plurality of peripherally disposed scraper blades 35, the free ends of which are curved outwardly. The blades 35, are preferably made of metal, and may be any desired length, but if preferred said blades may be made of a flexible material other than metal.

Rigidly secured on each side of the framework 8, near the front end of the machine is a downwardly projecting bearing bracket 36, for rotatably supporting the ends of a transverse axle or shaft 37, having the lower end of a chute, apron or receiving grate secured thereon between the side walls 9, and a short distance in front of the flexible scraping drum mechanism. The chute is narrower at one side and wider and deeper at the other side as shown in Fig. 2, to conform to the shape of the scraping drum mechanism, and is normally inclined outwardly and upwardly toward the scalding vat 1, with the upper end thereof disposed below the upper end of the conveyer 7, to receive carcasses therefrom. The chute comprises a base plate 38, upon which are riveted or otherwise secured the flanges 39, of a plurality of longitudinally disposed spaced parallel ribs or T-bars, the stems or plates 40, of which project upwardly at right angles to the base plate 38, and are reinforced by side webs 41, integrally connected between the flanges 39, and the stems 40, of said ribs and at right angles thereto. The stem plates 40, are rounded and of a greater depth near the upper end of the chute and gradually decrease in depth toward the lower end of the chute, where said stem plates 40, project beyond the lower edge of the base plate. Rigidly secured to the bottom of the lower margin of the chute base plate 38, are a plurality of apertured connecting brackets 42, which are keyed or otherwise secured on the rotatably mounted chute shaft 37.

Rotatably mounted on one side of the framework 8, and near the front end thereof, is a stub shaft 43, which projects into the machine underneath the chute base plate 38, and has keyed or otherwise secured on the outer end thereof one end of a lever 44. The stub shaft 43, extends to about the center of the chute, and has keyed or otherwise secured to the inner end thereof one end of a lift or crank arm 45, having rotatably mounted on the other end thereof a roller 46, which engages the bottom surface of the chute base plate 38. Secured to the bottom of the chute base plate 38, is a screw eye 47, to which one end of a chain 48, is attached. The other end of said chain 48, is connected to the roller end of the crank arm 45, to afford a means whereby the chute may be returned to normal position after the same has been tipped or moved toward the scraping drum mechanism. Said chain also serves to limit the inward movement of the chute to prevent the same from striking against the flexible scraping drum mechanism.

Secured to the outside of each of the side walls 9, below the door 11, is a bearing bracket 49, for rotatably supporting the ends of a transverse axle or shaft 50, to which is rigidly secured a plurality of spaced parallel tines or arms 51, adapted to be moved into position to control the downward movement of carcasses on the receiving chute, to prevent said carcasses from falling with too great a force against the flexible scraping drum mechanism. Keyed or otherwise secured on one end of the axle 50, on the outside of the machine, is one end of a crank arm 52, to the other end of which is pivotally connected one end of a lever 53, provided with a notch 54, in the lower edge thereof adapted to permit the lever to be moved to lockingly engage in a notch of a plate extension 55, secured on one of the front corners of the framework 8, for supporting the lever 53, which is adapted to slide through the notch in said plate. As shown in Fig. 2, the arms 51, of the carcass fall breaking mechanism are of different lengths to conform to the shape of the scraping drum mechanism.

The operation is as follows:

The carcasses, after being scalded in the scalding vat 1, are pushed onto the elevating conveyer 7, and delivered to the pivoted chute, the stem plates 40, of which receive the carcasses on the edges thereof. The machine is set in operation by slipping the power belt from the idler pulley 24, to the driving pulley 23, thereby causing rotation of the flexible scraping drum mechanism and the scalding vat conveyer 7, through the chain 19, the sprocket gear 20, and sprocket wheel 18. The normal inclined position of the receiving chute permits a carcass to slide downwardly thereon into the cleaning machine and into beating position between the lower portion of the chute and the flexible scraping wheels of the cleaning drum mechanism. The entrance of a carcass into the machine after delivery by the conveyer 7, is controlled by the fall breaking mechanism which is manually operated by pulling forwardly on the lever 53, thereby swinging the arms 51, downwardly toward the chute to engage an entering carcass to break the fall thereof to prevent the carcass from striking against the dehairing or cleaning scraper drum mechanism with too much force. If desired the lever may be moved into a position wherein the notch 54, thereof will lockingly engage the plate 55, to hold the arms 51, in lowered position to intercept and break the fall of large carcasses only and permit smaller carcasses to pass into scraping position. It will thus be seen that the entrance of carcasses of different sizes may be readily controlled by an operator positioned to operate the lever 53.

A carcass falling into scraping position between the lower portion of the chute and the flexible scraping wheels of the scraper drum mechanism, is rotated by the wheels which clean, scrape and massage the carcass to clean and dehair the same by the continuous operation of the cleaning mechanism, the flexible wheels of which flex continuously to conform to the shape of the carcass to clean all parts thereof. The spraying device 16, is provided for spraying hot water upon the carcasses as they are being scraped or massaged. The flexible rims 34, as well as the flexible radial spokes 28, of the scraper wheels when flexed are of course thrown or moved outwardly again into normal position by centrifugal action. The varying diameters of the scraper drum wheels afford an arrangement to conform to the bodies of the carcasses, and also permits carcasses of different sizes to be thoroughly cleaned.

When a carcass in the silently operating machine has been sufficiently cleaned, the operator lifts the lever 44, into the raised dotted line position shown in Fig. 3, thereby simultaneously moving the crank arm 45, the roller 46, of which rolls on the bottom of the chute to swing the chute inwardly toward the scraper drum mechanism, as shown in dotted lines in Fig. 3, to reduce the space between said chute and scraper drum mechanism. The revolving action of the flexible drum mechanism gradually forces the cleaned carcass upwardly in the machine against the chute, and when sufficiently elevated causes the carcass to be carried by centrifugal force upwardly thereover to be discharged onto the shelf 13—15, to permit the carcass to roll onto the table 14, from which it is removed by any suitable means. The curtain 17, acts to prevent water from being thrown out of the rear end of the machine by the centrifugal action of the revolving scraper drum mechanism, and the lower portion of said curtain 17, swings outwardly to permit the discharge of carcasses.

The movement of the chute toward the scraper drum mechanism is limited by the chain 48, which also acts to pull the chute back into normal position when the lever 44, is pulled forwardly toward the scalding vat. From the arrangement of parts it will be seen that the scraper drum mechanism is adapted to co-act with the adjustable chute to rotate and clean and then elevate and discharge a carcass from the machine.

I am aware that numerous details of construction may be varied through a wide range without departing from the principles of this invention, and I therefore do not purpose limiting the patent granted otherwise than necessitated by the prior art.

I claim as my invention:

1. In a carcass cleaning machine the combination with a pivotally mounted carcass receiving chute, of a flexible scraping drum mechanism adapted to co-act therewith to clean and discharge carcasses.

2. In a carcass cleaning machine of the class described the combination with a scraper wheel mechanism, of a receiving apron adapted to be moved toward and away from said scraper wheel mechanism to permit a carcass to be cleaned and then discharged from the machine by said scraper wheel mechanism.

3. A carcass cleaning machine embracing a scraping wheel mechanism, and an apron adapted to co-act therewith to permit said wheel mechanism to first clean and then discharge a carcass from the machine.

4. A sanitary carcass cleaning machine comprising a flexible scraping wheel mechanism, and a carcass receiving apron adapted to co-act therewith to permit said flexible scraping wheel mechanism to first clean and then discharge a carcass from the machine.

5. A silent carcass dehairing machine comprising a flexible scraping drum mechanism, and a pivotally mounted carcass receiving chute adapted normally to permit a carcass to be dehaired by the drum mechanism, said chute then adapted to be moved toward the drum mechanism to co-act therewith to permit the dehaired carcass to be discharged by said drum mechanism.

6. A carcass cleaning machine comprising a rotatable flexible scraper drum mechanism, an adjustable carcass receiving chute, and means for adjusting the chute to permit a carcass which has been cleaned by said flexible beater drum mechanism to be elevated and then discharged from the machine by said flexible beater drum mechanism.

7. A carcass cleaning machine embracing a rotatable flexible scraping drum, adjustable means for normally receiving a carcass to permit the carcass to be scraped and massaged by said drum, means associated therewith for controlling the entrance of a carcass into the machine, and means for moving said adjustable means toward said drum to permit said drum to elevate and then discharge the cleaned carcass from the machine.

8. In a carcass cleaning machine the combination with a carcass cleaning and discharging drum mechanism, of an adjustable carcass receiving chute, and means for breaking the fall of a carcass entering the machine on said chute.

9. In a carcass cleaning machine the combination with a flexible rotatable scraping drum mechanism, of an adjustable carcass receiving mechanism, means for controlling the entrance of a carcass into the machine on said receiving mechanism, and manually operatable means for adjusting said receiving mechanism to permit said drum mechanism to discharge a carcass from the machine after it has been cleaned.

10. In a carcass cleaning machine the combination with a carcass receiving chute, of scraping means co-acting therewith for cleaning, elevating and then discharging a carcass from the machine.

11. In a carcass dehairing and cleaning machine, an adjustable support for a carcass, flexible scraping means for acting on a carcass on said support for scraping and rotating the carcass, and means for swinging the support into a position permitting the cleaned carcass to be elevated in the machine by said scraping means and then discharged thereby.

12. In a machine of the class described the combination with an adjustable carcass support, of flexible scraping means rotatably disposed adjacent thereto adapted to clean and rotate a carcass on said support and then discharge the cleaned carcass from the machine over itself.

13. In a carcass cleaning machine the combination with a pivotally mounted carcass receiving chute, of a roller mechanism for adjusting the same, and a flexible scraping drum mechanism adapted to co-act with said chute to clean and discharge carcasses.

14. In a carcass cleaning machine the combination with a scraper wheel mechanism, of a receiving apron, and lever operated means adapted to move said apron toward and away from said scraper wheel mechanism to permit a carcass to be cleaned and then discharged from the machine over the top of said scraper wheel mechanism.

15. A carcass dehairing machine comprising a flexible scraping drum mechanism, a pivotally mounted carcass receiving chute adapted normally to permit a carcass to be dehaired by the drum mechanism, and a lever operated roller mechanism adapted to move the chute toward the drum mechanism to co-act therewith to permit the dehaired carcass to be discharged by said drum mechanism.

16. A carcass cleaning machine comprising a rotatable flexible scraper drum mechanism, an adjustable carcass receiving chute, means for adjusting the chute to permit a carcass which has been cleaned by said flexible scraper drum mechanism to be elevated and then discharged from the machine by said flexible scraper drum mechanism, and flexible means connected with the adjusting means and with said chute to permit return of the chute to normal position.

17. In a carcass cleaning machine the combination with a carcass receiving chute, of adjustable means for controlling the entrance of a carcass upon said chute, and scraping means co-acting with the chute for cleaning, elevating and then discharging the carcass from the machine.

18. In a carcass dehairing and cleaning machine, an adjustable support for a carcass, a plurality of arms thereabove, means for operating said arms to control the entrance of a carcass on said support, flexible scraping means for acting on the carcass on said support for scraping and rotating the carcass, and means for swinging the support into a position permitting the cleaned carcass to be elevated in the machine by said scraping means and then discharged thereby.

19. In a machine of the class described the combination with an adjustable carcass support, of a lever operated arm below said support, a roller on said arm engaging said support for the purpose of swinging the same, and a flexible scraping means rotatably disposed adjacent the support adapted to clean and rotate a carcass on said support and then discharge the cleaned carcass from the machine over the scraping means as the support is moved toward said scraping means.

20. A carcass cleaning machine comprising a casing, a rotatable scraping mechanism therein, a carcass receiving chute pivoted adjacent said mechanism, means for controlling the entrance of a carcass on said chute, means for washing the carcass as it is cleaned by said mechanism, and means for operating said chute to cause said mechanism to discharge the cleaned carcass from the machine over the mechanism.

21. In a carcass cleaning machine the combination with carcass cleaning mechanisms, of means for controlling the entrance of a carcass into the field of operation of said mechanisms.

22. The combination with a carcass cleaning machine; of a carcass cleaning drum of varying diameter, and a carcass receiving chute of varying width adapted to co-act with said drum for cleaning a carcass on said chute.

23. The combination with a flexible carcass cleaning drum of varying diameter, of a pivoted chute formed to conform to the shape of said drum and adapted to support a carcass to permit the same to be cleaned by the drum.

24. In a carcass cleaning machine the combination with a carcass scraping drum of varying diameter, of a carcass supporting chute of varying width mounted adjacent said drum, and means for controlling the entrance of a carcass on said chute into the field of operation of said drum.

25. The combination with a carcass cleaning machine, of a carcass receiving chute comprising a base plate, a plurality of parallel carcass supporting ribs securely mounted thereon, and means on said base plate to permit mounting of said chute.

26. The combination with a carcass cleaning machine, of a shaft supported thereon, and a chute pivotally mounted on said shaft comprising a base plate, bearing brackets secured to said base plate and engaged on said shaft, and a plurality of spaced ribs secured on said base plate adapted for supporting a carcass.

27. A carcass supporting chute comprising a base plate, means thereon to permit mounting of the base plate, and a plurality of inclined ribs rigidly secured on said base plate.

28. A carcass supporting chute comprising a base plate of varying width, means thereon for mounting the chute, and a plurality of inclined ribs of varying length securely mounted on said base plate.

29. A carcass supporting chute comprising a base plate, and a plurality of parallel ribs secured thereon and projecting beyond one edge thereof.

30. The combination with a carcass cleaning machine, of a carcass cleaning drum of varying diameter rotatably mounted on said machine.

31. The combination with a carcass cleaning machine, of a carcass cleaning drum rotatably mounted therein comprising a cylindrical supporting means, and a plurality of scraping mechanisms of different diameters secured around said cylindrical supporting means.

32. A carcass cleaning drum comprising a cylindrical supporting frame, and a plurality of flexible scraping rims of different diameters secured thereto in parallel spaced relation.

33. A carcass cleaning drum comprising a cylindrical supporting frame, a plurality of flexible scraping rims of different diameters disposed therearound, and flexible spoke members connecting said rims to said frame.

34. A carcass cleaning drum comprising a pair of flat rimmed wheels, a plurality of bars rigidly connecting said wheels together, a plurality of flexible rims of different diameter disposed around said bars, a plurality of flexible spokes of different lengths connecting said rims to said bars, and scraping blades secured to said rims.

In testimony whereof I have hereunto subscribed my name in the presence of two subscribing witnesses.

JOHN W. KOHLHEPP.

Witnesses:
 FRED E. PAESLER,
 FRANK A. BREMER, Jr.